Patented Nov. 9, 1948

2,453,327

UNITED STATES PATENT OFFICE 2,453,327

HYDROCARBON CONVERSION

Edwin T. Layng, Jersey City, N. J., and Frank T. Suman, Jr., Nyack, N. Y., assignors to The M. W. Kellogg Company, Jersey City, N. J., a corporation of Delaware No Drawing. Application June 18, 1942, Serial No. 447,588

9 Claims. (Cl. 260—668)

1

This invention relates to improvements in hydrocarbon conversion processes employing catalyst compositions comprising a minor proportion of molybdenum oxide in combination with a major proportion of an alumina carrier. More particularly, the invention relates to improvements in hydrocarbon conversion processes such as hydrogenation, dehydrogenation, reforming and aromatization by means of a catalyst composition comprising a major proportion of a carrier material comprising alumina in combination with a minor proportion of molybdenum oxide. Still more particularly, the invention relates to an improved process for treating naphtha of low antiknock value to effect conversion thereof to gasoline constituents of high anti-knock value by means of a catalyst composition comprising a major proportion of alumina and minor proportions of molybdenum oxide and titania.

Catalyst compositions comprising minor proportions of molybdenum oxide in combination with a major proportion of an alumina carrier material have been suggested for use in the promotion of many hydrocarbon conversion reactions. Such catalysts have been employed extensively in the treatment of liquid hydrocarbons in processes involving dehydrogenation and cyclization and other reactions incidental to the reforming of naphtha. For example, catalyst compositions consisting of minor proportions of molybdenum oxide in combination with a major proportion of alumina have gone into extensive use in the reforming of naphtha of low anti-knock value under conditions effective to dehydrogenate and cyclicize aliphatic hydrocarbons. Such catalyst compositions are also employed in the treatment of relatively narrow-boiling naphtha fractions containing large proportions of paraffinic and naphthenic hydrocarbons having seven carbon atoms per molecule to effect conversion thereof to toluene. These catalyst compositions also are used in the dehydrogenation of normally gaseous paraffin hydrocarbons to form corresponding olefins and in the dehydrogenation of olefins such as the dehydrogenation of butene to butadiene.

In these processes employing the alumina-molybdenum oxide catalyst, the hydrocarbon reactants are passed in the vapor form through a fixed body or mass of the granular catalytic material at the desired reaction temperature, the endothermic heat of reaction being supplied to the reaction zone. In these hydrocarbon conversion operations the catalyst is temporarily deactivated by the accumulation of carbonaceous deposits which are formed as the result of undesirable side

2 reactions and which cover the active surfaces of the catalyst. The loss of activity of the catalyst which results from the deposition of carbon in this manner requires periodic removal of such carbonaceous deposits from the catalyst surfaces in order to maintain the activity of the catalyst at a satisfactory level. Regeneration of the catalyst is accomplished ordinarily by passing an oxygen-containing gas such as a mixture of air and flue gas containing 2 to 4 per cent of oxygen over the temporarily deactivated catalyst to burn the carbonaceous deposits from the catalyst surfaces. The oxygen content of the regenerating gas is restricted to a relatively low figure in order that the gas shall have sufficient heat capacity to absorb and remove from the reactor a sufficient proportion of the heat of combustion to prevent overheating of the catalyst.

Molybdenum oxide is oxidized during the regeneration step to a substantially higher state of oxidation. The higher oxide or oxides thus produced are then reduced during the initial period of the subsequent reaction step by contact with the hydrocarbon reactants or with hydrogen which may be formed in the reaction zone or introduced into the reaction zone with the hydrocarbon reactants. This initial reduction step apparently converts the molybdenum oxide to a lower state of oxidation which apparently is the condition in which this activating oxide imparts greatest catalytic activity to the catalyst.

Each regeneration treatment of the catalyst, therefore, involves not only the oxidation of the carbonaceous deposit but also successive oxidation and reduction of the molybdenum oxide. The oxygen and hydrogen requirements of the regeneration step which are attributable to the oxidation and reduction of the catalyst are important factors in regulating the periods of reaction and regeneration in the process employing the catalyst.

The oxygen requirement of the regeneration step which is attributable to the oxidation of the molybdenum oxide to a high state of oxidation is an important factor, not because of the cost of the oxygen, but because of the increased bulk of regenerating gas required in the regeneration step. The cost of supplying oxygen to the regeneration step for oxidation of the catalyst resides in the energy and equipment expense in supplying a large bulk of regenerating gas containing a relatively minor proportion of oxygen to the reactor during the regeneration step at closely controlled temperatures.

The hydrogen consumption of the process which is attributable to reduction of the molybdenum oxide from the high state of oxidation resulting from the regeneration step results not only in consumption of hydrogen and the removal from the reaction zone of hydrogen which would otherwise be effective in retarding carbon formation but also produces a rise in temperature in the reaction zone which must be compensated for. The reduction of the molybdenum oxide also results in the formation of water in the reaction zone which may injure the catalyst and which must be separated from the reaction products.

The increase in the reaction zone temperature which may result from the reduction of the catalyst at the beginning of the operating run may be avoided by subjecting the catalyst mass to a preliminary treatment with a hydrogen-containing gas prior to the passage of hydrocarbon reactants therethrough. In any case, however, the oxidation and reduction of the molybdenum oxide in the regeneration operation imposes on the process an oxygen and hydrogen requirement which varies in magnitude with the frequency of regeneration since the degree of oxidation and reduction of the catalyst is the same in each regeneration step regardless of the quantity of carbon which is removed in that step.

It is an object of this invention to provide an improved hydrocarbon conversion process employing an alumina-molybdenum oxide catalyst wherein the process is improved by the employment of an improved catalyst which produces carbon at a substantially lower rate whereby longer operating runs with less frequent regeneration steps are possible or whereby the amount of carbon to be removed in each regeneration step is substantially smaller, thus minimizing the problems incidental to the absorption of the heat of combustion while avoiding overheating of the catalyst.

In accordance with this invention the catalyst composition comprising a major proportion of alumina and a minor proportion of molybdenum oxide is modified by the incorporation therein of titania in a proportion sufficient to reduce substantially the carbon-forming tendency of the catalyst composition but insufficient to alter substantially the catalytic activity of the catalyst composition in the promotion of the desired hydrocarbon conversion reactions.

In the preparation of the improved catalyst composition it is preferred to employ alumina obtained by the dehydration of synthetic or naturally-occurring aluminum hydrates. Dehydration is effected ordinarily by heating the hydrate to temperatures in the range of 600° to 1400° F. Preferably, the alumina is heated to substantially complete dehydration at temperatures of about 1200° F. One form of alumina which may be employed in the preparation of the improved catalyst is activated alumina which is prepared by removing and dehydrating the scale which is deposited on the walls of the precipitation tanks employed in the Bayer process. Another form of alumina which may be employed is alumina gel which may be prepared, for example, by peptizing an aluminum hydrate or by precipitation in an aluminum salt solution under proper conditions. A form of alumina which is relatively less expensive and which may be employed in the preparation of catalysts of high activity is obtained by the dehydration of synthetic aluminum hydrate.

Synthetic aluminum hydrate may be obtained by precipitation from a sodium aluminate solution by the Bayer process. In this process bauxite is treated with a strong solution of caustic soda in a closed vessel under steam pressure. The resulting sodium aluminate solution is filtered to separate the insoluble impurities and is then passed to the precipitating tanks. A small amount of freshly precipitated aluminum hydrate is added to the solution, and the contents of the precipitating tanks are then stirred for some time to effect precipitation of a large proportion of the alumina in solution which occurs as the result of hydrolysis. By another method of preparation bauxite is fused with sodium carbonate to form sodium aluminate. The fused mass is then merged with hot water, filtered, and the aluminum hydrate is precipitated from the sodium aluminate solution by the passage of carbon dioxide therethrough.

The molybdenum oxide may be incorporated in the catalyst composition as such or in the form of a compound which is convertible to the oxide by heating at temperatures which are not high enough to injure the catalyst. Preferably, the molybdenum is incorporated in the mixture in the form of an aqueous solution of a soluble compound of molybdenum which is later convertible to the oxide. A solution of ammonium molybdate is highly satisfactory for this purpose.

The titania may be incorporated in the catalyst composition as such or as a compound which is convertible to the oxide after the formation of the catalyst composition. Advantageously, the titanium hydroxide may be precipitated as a gelatinous mass from a suitable solution, such as a hydrolyzed solution of titanium chloride, by means of a suitable reagent such as ammonium hydroxide. The gelatinous precipitate, after being washed and filtered several times, is then intimately mixed with the other ingredients. A suitable source of titania is "titania acid cake," resulting from the precipitation of titania hydroxide in sulfuric acid, the solution having been obtained by extraction of the roasted ore with sulfuric acid. The acid cake should be washed several times with water to reduce the acidity and then may be used in the moist condition or may be dried prior to use.

The molybdenum oxide may be incorporated in the catalyst in any desirable proportion, which should be ordinarily at least 1 weight per cent. Maximum activity is obtained ordinarily by the incorporation of 6 to 9 weight per cent of the molybdenum oxide, although as much as 12 per cent may be desirable for some uses. Increasing the percentage of molybdenum oxide above these optimum figures does not ordinarily produce any increase in activity of the catalyst which is sufficient to justify the increased proportion of this relatively expensive ingredient.

The beneficial effect of the addition of titania is obtained to some degree by the incorporation of relatively small quantities of this material in the catalyst composition. Ordinarily, 2 weight per cent is sufficient to produce a marked change in the characteristics of the catalyst composition. The optimum percentage appears to be about 10 weight per cent, and no advantage appears to reside in the use of amounts greater than 20 per cent. In general the alumina and titania should be employed in the catalyst mass in a weight ratio of alumina to titania in the range of 4:1 to 50:1.

The invention will be described in more detail by reference to the preparation and testing of specific catalyst preparations in which the proportion of titania is varied to demonstrate the effect of the presence of titania on the carbon formation by the catalyst during the hydrocarbon conversion process.

The alumina employed in the preparation of the catalysts was obtained by dehydrating aluminum hydrate. This treatment involved heating aluminum hydrate at 1200° F. for three hours.

The titania employed in the preparation of the catalysts was obtained by a method of which the following is an example:

100 pounds of titania acid cake were stirred with 20 gallons of wash water. The slurry was filtered in a press and was washed in the press with 200 gallons of water. The moist cake removed from the press contained 58.2 per cent water and, in most of the preparations, was employed in that condition. In one preparation, however, the titania was partially dried at 110° C. to a water content of 15.6 per cent, prior to use.

In the preparation of the alumina-molybdenum oxide catalysts the alumina was made into a paste by intimate mixing of the alumina with the ammonium molybdate solution. In the preparation of the catalysts containing titania the alumina and titania were first intimately mixed, and the mixture thus obtained was then made into a paste with the ammonium molybdate solution. This order of mixing of the ingredients appears to be superior to any other in the preparation of catalysts of maximum activity.

The paste or moist mass was then heated at 1200° F. for one hour, and the material thus obtained after cooling was formed into ⅛ inch pellets, 2 per cent of graphite being incorporated in the mixture to assist in pelleting. This material had no effect on the catalysts and is therefore ignored in the further consideration of the catalyst compositions.

The quantities of materials employed in the preparation of the catalysts are set forth below in Table I in which the data are arranged to show the catalyst number, the weight and water content of the alumina employed, the weight and water content of the titania employed, the weight of ammonium molybdate employed and the volume of the ammonium molybdate solution.

Table I

| Catalyst Number | Alumina | | Titania | | Ammonium Molybdate | |
|---|---|---|---|---|---|---|
| | Grams | Per cent H₂O | Grams | Per cent H₂O | Grams | c. c. of sol. |
| 518 | 596 | 1.4 | | | 14.7 | 460 |
| 553 | 582 | 4.0 | 71.8 | 58.2 | 14.7 | 450 |
| 501 | 576 | 2.1 | | | 44.1 | 450 |
| 550 | 556 | 4.0 | 71.8 | 58.2 | 44.2 | 450 |
| 556 | 556 | 4.0 | 35.5 | 15.6 | 44.2 | 450 |
| 551 | 525 | 4.0 | 143.5 | 58.2 | 44.2 | 450 |

The catalysts whose preparations are described above were tested for activity and carbon formation in the treatment of a straight-run East Texas heavy naphtha having initial and end boiling points of 240° F. and 396° F., respectively. This naphtha contained 14 volume per cent aromatic hydrocarbons, 33 volume per cent naphthenes and no olefin hydrocarbons. It had an A. S. T. M. octane number of 42.3. The naphtha was passed over the granular catalyst in the vapor form in a suitable reactor at a space velocity of 1 volume (liquid basis) per hour per volume of catalyst space. The reaction zone was surrounded by a lead bath which was maintained at a temperature of 950° F. The reactor was maintained under a gauge pressure of 200 pounds per square inch. Hydrogen was passed into the reactor with the naphtha charge at a rate of approximately 2400 cubic feet per barrel of naphtha.

Comparative results from the testing of the various catalysts in the treatment of the naphtha are set forth below in Table II. Since it is known that molybdenum oxide catalysts sometimes do not display full activity in the initial test run and prior to the first regeneration of the catalyst, the test data in Table II are limited to that obtained in the second operating runs on the catalysts following an initial operating run and a regeneration treatment. In the regeneration treatment a gaseous mixture consisting principally of nitrogen and other inert gases and containing 1 to 3 per cent of oxygen was passed over the catalyst at the reaction temperature and pressure to ignite and burn carbonaceous deposits on the surfaces of the catalyst. This treatment was continued until no further reaction was apparent, seven hours usually being required. Thereafter and prior to the operating run a hydrogen-containing gas mixture was passed through the reactor and over the catalyst at the reaction temperature and pressure for a period of about one hour. This treatment served to purge the reactor of inert gases and oxygen and served also to effect the preliminary reduction of the highly oxidized molybdenum to a more stable, and lower, state of oxidation. Thereafter, the operating run was initiated by starting the passage of the hydrocarbon reactants through the reaction zone in mixture with the hydrogen-containing gas in the proportions given above. The operating run continued for a period of six hours.

In Table II the data are arranged to show the composition of the catalyst by weight in terms of titania and molybdenum oxide, the remainder in each case being alumina. The results of the operating runs are given in terms of the volume per cent of the naphtha converted to gasoline, the weight per cent of the charge converted to gas and carbon, and the A. S. T. M. octane number of the gasoline product.

Table II

| Catalyst Number | Wt. percent TiO₂ | Wt. percent MoO₃ | Vol. percent Gasoline | Wt. percent Gas | Wt. percent Carbon | A. S. T. M. Octane Number |
|---|---|---|---|---|---|---|
| 518 | 0 | 2 | 92.4 | 5.4 | .4 | 66.5 |
| 553 | 5 | 2 | 90.8 | 8.2 | .1 | 67.9 |
| 501 | 0 | 6 | 87.3 | 9.7 | .6 | 76.8 |
| 550 | 5 | 6 | 87.8 | 8.2 | .2 | 77.1 |
| 556 | 5 | 6 | 87.0 | 9.7 | .2 | 76.5 |
| 551 | 10 | 6 | 87.4 | 9.5 | .2 | 78.5 |

In Table II the data for Catalysts Nos. 518 and 553 demonstrate the effect of the incorporation of 5 per cent of titania in the alumina-molybdenum oxide catalyst composition, represented by Catalyst No. 518. Whereas Catalyst No. 518 containing no titania had a carbon yield of 0.4 weight per cent, Catalyst No. 553, containing 5 weight per cent of titania, converted 0.1 weight per cent of the naphtha to carbon. In the operating run on Catalyst No. 553 the amount of carbon deposited on the catalyst was, therefore, 75 per cent less than the amount deposited on the catalyst in the run employing Catalyst No. 518.

The series of catalysts in Table II which contain 6 per cent of molybdenum oxide demonstrate even more conclusively the effect of titania in the reduction of the carbon-forming tendency of the catalyst. Whereas Catalyst No. 501 which contained no titania converted 0.6 weight per cent of the naphtha to carbon, the yield of carbon when employing Catalysts Nos. 550, 556 and 551 was only one-third that figure. Comparing Catalysts Nos. 550 and 556 with Catalyst No. 501, it is to be seen that the substitution of 5 per cent of titania for alumina in the catalyst composition represented by Catalyst No. 501 effected a substantial reduction in the carbon-forming tendency of the catalyst while maintaining the activity of the catalyst for the promotion of desirable reactions. For example, Catalysts Nos. 550 and 556 produced only one-third the quantity of carbon produced by Catalyst No. 501 while producing gasoline of the same octane number and at the same yield. By the substitution of 10 weight per cent of titania for alumina in the catalyst composition represented by Catalyst No. 501 an even more favorable result was obtained. Catalyst No. 551 containing 10 weight per cent of titania produced a yield of carbon which was only one-third that of Catalyst No. 501, while producing the same yield of a gasoline of superior octane number.

In the foregoing specific examples of the application of the process, to the treatment of naphtha to produce gasoline of higher anti-knock value, uniform operating conditions were employed to permit a comparison of the results obtained. In the application of the invention to the treatment of naphtha the reaction conditions necessarily must be selected with reference to the character of the hydrocarbons being treated, the results desired and the composition of the catalyst. Treatment of naphtha for this purpose should be carried out at temperatures of 850° F. to 1050° F. Within this temperature range space velocities of 0.1 to 3.0 volumes of liquid per volume of catalyst space per hour may be employed advantageously. Hydrogen is circulated through the reaction zone as in the foregoing specific examples, and this operation may be carried out on a recycling basis since hydrogen is produced in the process. Hydrogen is recycled in the amount of 0.5 to 9.0, preferably 3.0, molecules of hydrogen per molecule of hydrocarbon reactants. The hydrogen may be in admixture with light gaseous hydrocarbons. The recycling of hydrogen in this manner is advantageous, particularly when the reaction zone is maintained under a hydrogen pressure of 30 to 450 pounds per square inch gauge, in maintaining the activity of the catalyst.

While the invention has been described by reference to specific examples involving the treatment of a specific mixture of hydrocarbons, the invention is also applicable to the treatment of other mixtures of hydrocarbons or individual hydrocarbons. For example, the invention includes the treatment of individual aliphatic hydrocarbons such as normal heptane to effect conversion thereof to heptene and toluene. Normally gaseous hydrocarbons also are treated in accordance with the improved process. For example, butane is treated to effect dehydrogenation thereof to butene, or butene is dehydrogenated to butadiene. In addition to the production of simple aromatic hydrocarbons, as by treatment of naphthenic or aliphatic hydrocarbons such as heptane, the process is applicable to the production of more highly cyclicized hydrocarbons such as naphthalene and anthracene.

While the foregoing specific examples of the improved conversion process involved the use of a fixed bed of granular catalyst, through which the reaction mixture and the regenerating gases were passed alternately, it is evident that the invention is not limited to operations employing the improved catalyst in a static condition. The improved process involves as well the use of the catalyst in granular or powdered form in a moving body. In this method of operation the catalyst mass moves downwardly, either continuously or intermittently, through the reactor as the result of continuous or periodic removal of a portion of the catalyst mass at the bottom of the reactor and corresponding replenishment with fresh or regenerated catalyst at the top of the reactor. In another application of the invention the powdered catalyst is suspended in the stream of reactants and thus passed through the reaction zone with the reactants. In another method of operation the powdered catalyst is maintained as a fluidized, or pseudo-fluid, mass in the reaction zone by the passage of the vaporized reactants upwardly therethrough. Continuous addition and withdrawal of catalyst is effected by suspension of catalyst in the flowing stream of reactants and by direct addition and withdrawal by means independent of the stream of reactants. In all the operations involving the use of the catalyst in a non-static condition substantially continuous operation is attained in a single reactor, the withdrawn catalyst being regenerated, or otherwise treated, outside the reactor and returned for further use in the reactor without interrupting the flow of reactants therethrough.

We claim:

1. In a process for treating hydrocarbons in which a hydrocarbon is contacted at elevated temperature with a catalyst composition essentially consisting of a major proportion of an alumina carrier and a minor proportion of an activating oxide of a metal of the left-hand columns of groups V and VI of the periodic table, the step of incorporating in said catalyst a minor proportion of titanium oxide.

2. In a process for treating hydrocarbons in which a hydrocarbon is contacted at elevated temperature with a catalyst composition essentially consisting of a major proportion of an alumina carrier and a minor proportion of molybdenum oxide, the improvement which comprises incorporating in said catalyst a minor proportion of titanium oxide.

3. A hydrocarbon conversion process which comprises contacting a hydrocarbon at elevated temperature with a catalyst comprising a major proportion of a carrier comprising alumina and titania in a weight ratio of alumina to titania in the range of 4:1 to 50:1 and a minor proportion of an activating oxide of a metal of the left-hand columns of groups V and VI of the periodic table.

4. A hydrocarbon conversion process which comprises contacting a hydrocarbon at elevated temperature with a catalyst comprising a minor proportion of molybdenum oxide in combination with a carrier comprising alumina and titania in a weight ratio of alumina to titania in the range of 4:1 to 50:1.

5. In a process for dehydrogenating hydrocarbons in which a hydrocarbon is contacted at elevated temperature with a dehydrogenating catalyst essentially consisting of a major proportion of an alumina carrier and a minor proportion of an activating oxide of a metal of the left-hand columns of groups V and VI of the periodic table, the step of incorporating in said catalyst a minor proportion of titanium oxide.

6. In a process for treating a hydrocarbon fraction boiling at least partly within the gasoline boiling range to effect conversion thereof to gasoline constituents of high anti-knock value in which said fraction is contacted at elevated temperature with a catalyst composition essentially consisting of a major proportion of an alumina carrier and a minor proportion of an activating oxide of a metal of the left-hand columns of groups V and VI of the periodic table, the step of incorporating in said catalyst a minor proportion of titanium oxide.

7. In a process for treating hydrocarbons in which a hydrocarbon is contacted at elevated temperature with a catalyst essentially consisting of a major proportion of an alumina carrier and a minor proportion of an activating oxide of a metal of the left-hand columns of groups V and VI of the periodic table, which treatment is accompanied by the formation of carbonaceous deposits on the catalyst surface for deactivating the catalyst, the improvement which comprises reducing the rate of formation of said carbonaceous deposits on said catalyst surface by incorporating in said catalyst a minor proportion of titanium oxide.

8. A hydrocarbon conversion process which comprises contacting a hydrocarbon at elevated temperature with a catalyst essentially consisting of a major proportion of alumina in combination with minor proportions of titania and molybdenum oxide.

9. A hydrocarbon conversion process which comprises contacting a hydrocarbon at elevated temperature with a catalyst essentially consisting of alumina, titania and molybdenum oxide in the proportions of 1 to 12 parts of molybdenum oxide, 2 to 20 parts of titania and 68 to 97 parts of alumina.

EDWIN T. LAYNG.
FRANK T. SUMAN, JR.

REFERENCES CITED

The following references are of record in the file of this patent:

UNITED STATES PATENTS

| Number | Name | Date |
| --- | --- | --- |
| 2,288,336 | Welty, Jr., et al. | June 30, 1942 |
| 2,319,948 | Pitzer | May 25, 1943 |